United States Patent Office 2,875,131
Patented Feb. 24, 1959

2,875,131

4-TERT.-BUTYL α-METHYL HYDROCINNAMIC ALDEHYDE

Marion S. Carpenter, Nutley, and William M. Easter, Jr., Hasbrouck Heights, N. J., assignors to The Givaudan Corporation, New York, N. Y., a corporation of New Jersey No Drawing. Application June 11, 1956
Serial No. 590,360

4 Claims. (Cl. 167—94)

This invention relates to a novel aromatic aldehyde and more especially to 4-tert.-butyl α-methyl hydrocinnamic aldehyde.

Para-isopropyl α-methyl hydrocinnamic aldehyde, commonly called cyclamen aldehyde, has attained widespread use in perfumery for its lily or linden-blossom odor, lending a desirable floweriness to perfumed compositions containing this aldehyde.

In spite of its acceptance cyclamen aldehyde has certain characteristics which limit its application and effectiveness. One such characteristic is that soaps containing this aldehyde become flat and weak in odor after one month and develop a sour note within a period of a few months. Another such characteristic is the fact that cosmetic creams containing cyclamen aldehyde become rancid upon exposure to light for extended periods. Also, the fatty aldehyde notes in lilac and muguet compositions are not blended to the desired degree by cyclamen aldehyde. Other olfactory deficiencies of cyclamen aldehyde could be mentioned but the foregoing is believed to be representative of some of the important disadvantages attendant upon the use of this material.

It is the principal object of this invention to provide a novel aromatic substance which possesses the desirable olfactory properties of cyclamen aldehyde without the disadvantageous properties of this material. Other objects will become apparent from the following description.

Our novel aromatic substance is 4-tertiary-butyl α-methyl dihydrocinnamic aldehyde. It has been found to possess the desirable advantages without the undesirable characteristics of cyclamen aldehyde.

The unique combination of odor and other desirable characteristics of our novel substance was unexpected and, indeed, surprising. For one thing the isopropyl, isopropenyl and isopropylidene groups are favored in aromatic products as compared with the tertiary-butyl group. By this is meant that substitution of a tertiary-butyl group for the isopropyl, etc. groups results in a material lowering of the odor properties of the resulting compound.

That one could not have assumed or predicted that the novel compound of our invention would be so desirable olfactorily can be seen from the fact that other novel compounds having similar structures do not possess noteworthy odor value. Such compounds include the following:

4-α-dimethyl hydrocinnamic aldehyde
2,4-α-trimethyl hydrocinnamic aldehyde
2,5-α-trimethyl hydrocinnamic aldehyde
4-ethyl α-methyl hydrocinnamic aldehyde
2,4,5-α-tetramethyl hydrocinnamic aldehyde
5-isopropyl 2-α-dimethyl hydrocinnamic aldehyde
4-tert-amyl α-methyl hydrocinnamic aldehyde
5-tert-butyl 2-α-dimethyl hydrocinnamic aldehyde
4-n-propyl α-methyl hydrocinnamic aldehyde
α-Methyl β-cyclohexyl propionaldehyde In order further to illustrate our invention the following examples are given:

EXAMPLE I

*Preparation of 4-tert.-butyl-α-methyl hydrocinnamic aldehyde*

Charge into a reaction vessel equipped with agitator and reflux condenser 486 grams of p-tert.-butyl benzaldehyde, 320 grams of methanol and 10 grams of 35% sodium hydroxide solution and heat the mixture to reflux. Feed in, during one hour, 116 grams of propionaldehyde while maintaining reflux and agitation. When the addition is complete add sufficient acetic acid (about 5 grams) to make the reaction mixture faintly acid to litmus paper. Distill off the methanol, thin the remainder with 175 grams of benzene, and wash the solution first with water, then with 5% sodium carbonate solution and finally with water to neutrality. Distill off the solvent and vacuum distill the remainder.

There is collected, in addition to 172 grams of excess unreacted p-tert-butyl benzaldehyde, 342 grams of 4-tert.-butyl α-methyl cinnamic aldehyde as a yellow oil boiling at 114° C. at 1 mm. of mercury pressure which rapidly solidifies to a crystalline mass having a congealing point of about 65° C. and melting at about 67° C.

If desired, the distilled product may be further purified by crystallization from methanol or hexane to produce crystals of melting point 69° C. However, the distilled material is sufficiently pure to be used in the following operation:

Charge into an autoclave 202 grams of the above described 4-tert.-butyl α-methyl cinnamic aldehyde and 2 grams of a hydrogenation catalyst such as Raney nickel or palladium on charcoal and hydrogenate under a pressure of about 100–400 pounds per square inch and at a temperature of preferably 80°–100° C. until 24.5 liters of hydrogen (the amount required to saturate the double bond of the charged aldehyde, measured at 25°) has been absorbed. After cooling to room temperature the crude hydrogenated product, which is now a liquid, is filtered to remove catalyst and distilled in vacuo.

There is collected about 202 grams of 4-tert.-butyl α-methyl hydrocinnamic aldehyde as a colorless to pale yellow oil boiling at 95–96° C. at 1 mm. of mercury pressure. The product as thus prepared has an aldehyde content of 90–95% and contains as a contaminant the odorless corresponding alcohol, 4-tert.-butyl α-methyl hydrocinnamic alcohol. Such a product is entirely suitable for use in perfumery. Removal of the odorless alcohol will not improve the odor of the aldehyde, but will intensify it to the extent that the diluting effect of the alcohol will have been eliminated. If such beneficiation is desired it may be accomplished in various ways well-known to the art, for example, by converting the aldehyde to a bisulfite compound, washing out the alcohol and then regenerating the aldehyde.

The aforementioned purification procedure may be carried out in the following manner:

Dissolve the crude undistilled hydrogenation product in twice its weight of a solvent such as benzene or toluene and agitate for 1 hour at 60–65° with a solution of 104 grams of sodium bisulfite in 300 grams of water. Cool the pasty mixture, filter and wash the crystalline bisulfite addition product with fresh solvent (benzene or toluene). Suspend the washed crystals in 500 grams of water and liberate the aldehyde by the gradual addition, with agitation, of a solution of 40 grams of sodium hydroxide in 100 grams of water. Remove the upper oily layer of aldehyde, wash it with water and distill.

The aldehyde so purified has the following physical constants: Sp. gr. 25°/25° C., 0.942; $n_D^{20}$, 1.504; B. P., 95–96°/1 mm. Hg; purity, 99+%; color, colorless.

The novel product resembles cyclamen aldehyde in odor, but is sweeter, more intensely flowery and more persistent.

EXAMPLE II

*Soap containing 4-tert.-butyl-α-methyl hydrocinnamic aldehyde*

Soap cakes containing the novel substance of this invention and soap cakes containing the same amount of cyclamen aldehyde were made as follows:

20 grams of unperfumed standard #1 white soap stock and 0.2 gram of the perfuming agent were placed in a Coors 522–4 porcelain mortar and milled until the soap was reduced to a fine powder. Two ml. of distilled water were added and the mixture was milled again to produce a plastic mass. The soap thus prepared was put into a tabletting die which when pressed in a hand arbor press produced a round soap cake 3.8 cm. in diameter and 2.0 cm. thick.

The cakes were exposed to light and air indoors for a period of 7 months, during which time they were examined about once a week for the first month and monthly thereafter. The soap cake containing cyclamen aldehyde developed a sour note after approximately three months. The cakes containing the 4-tert.-butyl-α-methyl hydrocinnamic aldehyde remained sweet and strong for 6 months.

EXAMPLE III

*Cold cream containing 4-tert.-butyl-α-methyl-hydrocinnamic aldehyde*

A typical cold cream was prepared as follows:

| Portion A: | Grams |
|---|---|
| Beeswax | 12 |
| Mineral oil | 47 |
| Portion B: | |
| Borax | 1 |
| Water | 40 |
| | 100 |

The ingredients of portion A were weighed into a container provided with a source of heat and agitation. The contents were heated and stirred until the temperature was 68° C. and this temperature was maintained until the beeswax melted.

The ingredients of portion B were heated in a separate container until the temperature was 68° C. and then portion B was added to portion A with moderate stirring. The temperature was reduced to 50° C. under stirring and then the cream was poured into containers to cool to room temperature.

To separate 100 gram portions of this cream were added 0.5 gram of 4-tert.-butyl-α-methyl-hydrocinnamic aldehyde and 0.5 of cyclamen aldehyde. The samples were kept in flint glass jars and left exposed to light indoors for a period of 6 months.

The cream containing cyclamen aldehyde developed a rancid odor while the cream containing the 4-tert.-butyl-α-methyl hydrocinnamic aldehyde remained sweet.

EXAMPLE IV

*Soap perfume of fougère type containing 4-tert. butyl-α-methyl-hydrocinnamic aldehyde*

A soap perfume of the fougère type was prepared with the following composition:

FOUGÈRE BASE

| | |
|---|---|
| Ionone | 125.0 |
| Geraniol pure | 185.0 |
| Terpineol | 220.0 |
| Courmarin | 12.5 |
| Geranium bourbon oil | 37.5 |
| Lavandin oil (22–24% ester) | 25.0 |
| Oakmoss soluble resin (10% in diethyl phthalate) | 6.25 |
| Amyl benzoate | 50.0 |
| Amyl salicylate | 245.0 |
| Caraway NF oil (10% in diethyl phthalate) | 6.25 |
| Bay leaves West Indian oil | 6.25 |
| Olibanum soluble resin (10% in diethyl phthalate) | 12.5 |
| Undecylenic aldehyde (10% in diethyl phthalate) | 6.25 |
| O-phenylanisole | 37.5 |
| | 975.0 |

To separate 97.5 gram portions of this perfume were added respectively 2.5 grams of 4-tert.-butyl-α-methylhydrocinnamic aldehyde and cyclamen aldehyde.

The resulting perfumes were incorporated in soap cakes using the same soap stock, quantities and procedure as described in Example I. These soap cakes were left exposed to light and air indoors for a period of 6 months during which time they were examined about once a week for the first month and monthly thereafter.

The soap cake with the perfume containing 4-tert.-butyl-α-methyl-hydrocinnamic aldehyde was more pleasantly bouqueted and more fragrant than the one containing cyclamen aldehyde. After one month, the odor of the soap cake containing the perfume with cyclamen aldehyde became flat and weak. The soap cakes with our novel substance remained strong and sweet for 6 months.

EXAMPLE V

*Soap perfume of floral type containing 4-tert.-butyl-α-methyl-hydrocinnamic aldehyde*

Example IV was repeated, using a perfume of the floral type, having the following composition, in place of the perfume used in Example IV.

FLORAL BASE

| | |
|---|---|
| Phenylethyl alcohol | 444.0 |
| Benzyl acetate | 220.0 |
| Citronellol | 74.0 |
| Terpineol | 111.0 |
| α-Amylcinnamic aldehyde | 37.0 |
| Lavandin oil (22–24% ester) | 22.1 |
| Musk xylol 100% | 3.6 |
| Ionone | 44.0 |
| Heliotropine crystallized | 3.6 |
| Bois de rose (Brazil oil) | 7.4 |
| Cedarwood oil | 7.4 |
| Cinnamon leaf Ceylon oil | 3.7 |
| | 977.8 |

To separate 97.78 gram portions of this perfume were added respectively 2.22 grams of 4-tert.-butyl-α-methyl hydrocinnamic aldehyde and cyclamen aldehyde.

The resulting perfumes were incorporated in soap cakes using the same soap stock, quantities and procedure as described in Example I.

The results were the same as in the case of Example IV.

In similar manner, 4-tert.-butyl-α-methyl-hydrocinnamic aldehyde and cyclamen aldehyde were compared in lilac, muguet, rose and linden blossom compositions. It was found that ⅓ more cyclamen aldehyde was needed to give the floweriness produced by 4-tert.-butyl-α-methylhydrocinnamic aldehyde. The florals made with the latter were sweeter and more flowery. They dried with better flowery notes and lasted longer. Also, the novel substance of our invention blended the fatty aldehyde notes in florals while cyclamen aldehyde did not.

The foregoing illustrates the practice of this invention which however is not to be limited thereby but is to be construed as broadly as permissible in view of the prior art and limited solely by the appended claims.

We claim:
1. The novel substance, 4-tert.-butyl-$\alpha$-methyl-hydrocinnamic aldehyde.
2. Perfumes and perfume-containing compositions containing 4-tert.-butyl-$\alpha$-methyl-hydrocinnamic aldehyde.
3. A novel composition comprising 4-tert.-butyl-$\alpha$-methyl-hydrocinnamic aldehyde and a minor portion of 4-tert.-butyl-$\alpha$-methyl-hydrocinnamic alcohol.
4. Perfumes and perfume-containing compositions containing a composition comprising 4-tert.-butyl-$\alpha$-methyl-hydrocinnamic aldehyde and a minor portion of 4-tert.-butyl-$\alpha$-methyl-hydrocinnamic alcohol.

References Cited in the file of this patent
UNITED STATES PATENTS 2,184,526  Meuly _____ Dec. 26, 1939

OTHER REFERENCES

Poucher: Perfumes, Cos. and Soaps, D. Van Nostrand Co., N. Y., vol. I, 5th ed., 1952, pp. 84, 85, 151 and 275.

Merck Index, Merck and Co., Rahway, N. J., 6th ed., 1952, p. 172.